United States Patent
Kull et al.

(10) Patent No.: US 7,629,836 B2
(45) Date of Patent: Dec. 8, 2009

(54) ACTIVE EMC FILTER FOR MACHINE TOOLS

(75) Inventors: Peter Kull, Rüttenen (CH); Roland Kuepfer, Schönbühi (CH)

(73) Assignee: Schaffner Emv AG, Luterbach (CH)

( * ) Notice: Subject to any disclaimer, the term of this patent is extended or adjusted under 35 U.S.C. 154(b) by 0 days.

(21) Appl. No.: 11/779,507

(22) Filed: Jul. 18, 2007

(65) Prior Publication Data

US 2008/0143432 A1    Jun. 19, 2008

Related U.S. Application Data

(63) Continuation of application No. PCT/EP2005/050575, filed on Feb. 9, 2005.

(51) Int. Cl.
*H03K 5/00* (2006.01)

(52) U.S. Cl. .................... 327/552; 327/100; 363/37

(58) Field of Classification Search ............ 363/34–48, 363/98; 318/609, 611, 700, 702
See application file for complete search history.

(56) References Cited

U.S. PATENT DOCUMENTS

| | | | |
|---|---|---|---|
| 4,342,013 A * | 7/1982 | Kallman | .................... 333/181 |
| 4,402,028 A | 8/1983 | Udren | |
| 5,666,255 A | 9/1997 | Muelleman | |
| 6,222,285 B1 * | 4/2001 | Haley et al. | ................. 307/129 |
| 6,459,597 B1 * | 10/2002 | Igarashi et al. | ................. 363/39 |
| 6,775,157 B2 | 8/2004 | Honda | |
| 2002/0171473 A1 | 11/2002 | Pelly | |
| 2003/0128558 A1 | 7/2003 | Takahashi et al. | |
| 2003/0218498 A1 | 11/2003 | Pelly | |
| 2004/0008527 A1 * | 1/2004 | Honda | ......................... 363/39 |

FOREIGN PATENT DOCUMENTS

| EP | 1069673 | 1/2001 |
|---|---|---|
| WO | WO-99/01932 | 1/1999 |
| WO | WO-03/005578 | 1/2003 |

OTHER PUBLICATIONS

Quian Zhaoming et al., "Status of electromagnetic compatibility research in power electronics," The Third International Power Electronics and Motion Control Conference, Aug. 15-18, 2000, IEEE, vol. 1, Aug. 15, 2000, pp. 46-57.

I. Takahashi et al., "Active EMI filter for switching noise of high frequency inverters," Power Conversion Conference, Nagaoka, Japan, Aug. 3-6, 1997, IEEE, vol, 1, Aug. 3, 1997, pp. 331-334.

* cited by examiner

*Primary Examiner*—Rajnikant B Patel
(74) *Attorney, Agent, or Firm*—Blank Rome LLP

(57) ABSTRACT

An active EMC filter for machine tools allows reducing the leakage current normally induced by large phase-to-ground capacitances. The filter may comprise an active shunt module or an impedance converter or a correction signal generator and is suitable both for three-phase and single-phase applications.

9 Claims, 4 Drawing Sheets

US 7,629,836 B2

ACTIVE EMC FILTER FOR MACHINE TOOLS

REFERENCE DATA

This application is a continuation of International Patent Application PCT/EP2005/050575 (WO2006/084504) filed on Feb. 9, 2005, the contents whereof are hereby incorporated.

FIELD OF THE INVENTION

The present application relates to active electrical filters for suppressing unwanted noise component in machine tools and industrial power tools equipments. More particularly, but not exclusively, the present application deals with electromagnetic compatibility filters for mains lines or electrical supply lines of electrical machine tools.

DESCRIPTION OF RELATED ART

Electromagnetic compatibility (EMC) is an increasingly critical factor in the electric and electronic industry nowadays. A large number of electric circuits and appliances exist, which are liable to generate unwanted Radio Frequency Electro-Magnetic Interference (RF EMI), or to suffer from interferences generated by other circuits or appliances.

The conducted noises and disturbances in electrical equipment are generally dealt with by inserting a low-pass LC filter on the mains supply line of the noise-generating devices or of the noise-sensitive devices. Such filters attenuate the unwanted frequency components to a harmless level. Many filter topologies, including the classic "L", "T" and "pi" filter topologies, can be employed.

European Patent application EP1069673 shows an example of a three-phase noise suppression filter comprising passive elements.

Passive EMC filters have been proven effective in a number of applications. A shortcoming of this technique, however, is that in order to attain the required attenuation level, high-value capacitors and inductances are needed for this application. The size and cost of the resulting filter are mainly determined by these large components, in particular when high attenuation of common mode noise is needed. Moreover, the leakage current is directly proportional to the capacity of the filter capacitors.

Electrical machine tools represent a special case with regards to the problem of leakage current. In particular when the machine tool is employed in conjunction with a Residual Current Device (RCD), that is a safety device, for example in the electrical power outlet, which automatically breaks the power supply upon detection of leakage current exceeding a defined threshold.

In this case the harmless leakage current induced by the EMC adds to the possible fault current to ground of the machine tool, and effectively lessens the threshold of the RCD. Untimely intervention of the RCD can then follow.

A further concern with machine tools is that often fire protection regulation impose a low level of admissible leakage current.

The leakage current to ground due to the EMC filter can be lessened by reducing the value of the "Y" filtering capacitors. However this affects severely the effectiveness of the filter.

Increasing the inductance value of the filter choke can compensate the lower value of the "Y" capacitor, but only to a certain extent. Larger inductances have larger stray capacitance, which limits the attenuation, and are more costly and voluminous than conventional ones. Furthermore, the combination of a large inductance and a small capacity lessens the stability of the filter and can be the source of unwanted resonant oscillations.

The problem above is particularly sensitive in the case of an asymmetric three-phase system, like for example the system adopted by the Japanese distribution grid, in which one of the three phases is at ground potential. Large leakage current can derive, in this configuration, from leakage in filtering capacitors connected between the star-centre point and ground.

It is an aim of the present invention to provide an EMC filter for machine tools exhibiting a low leakage current.

It is also an aim of the present invention to provide an EMC filter for machine tools with a production cost lower than that of the known devices.

It is another aim of the present invention to provide an EMC filter for machine tools which is more compact than the known devices.

BRIEF SUMMARY OF THE INVENTION

These aims are attained by the device which is the subject of the appended independent claims, optional and additional useful features being introduced in the dependent claims.

DETAILED DESCRIPTION OF THE INVENTION

Figure 1:
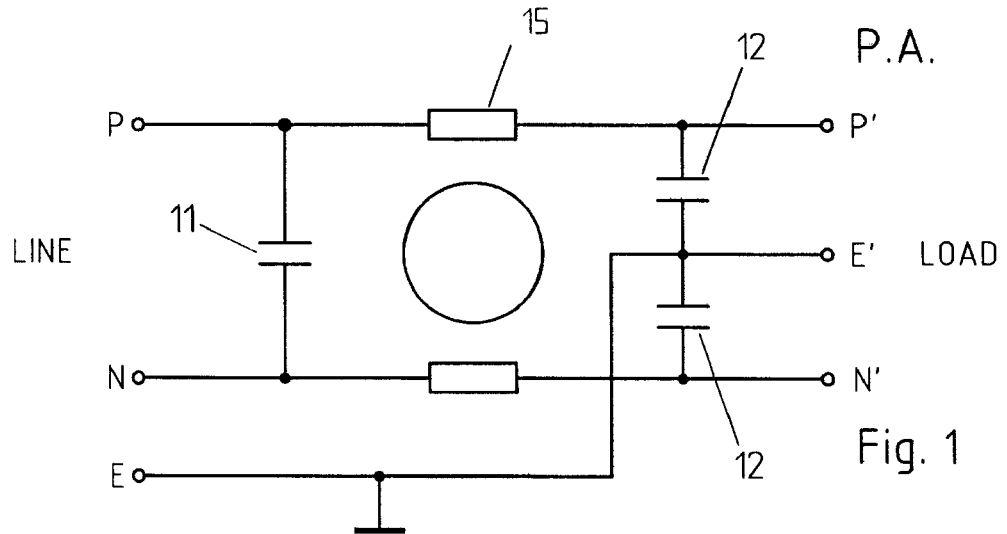
FIG. 1 represents an EMC passive filter of known type.

FIG. 1 represents a EMC passive filter of know type, comprising a current-compensated coil 15, an inter-phase capacitor 11 and two "Y" phase-to-ground capacitors 12. The "Y" capacitors 12 are effective in the suppression of common-mode interferences transmitted on the mains line, yet they are an important source of leakage current.

Figure 2:
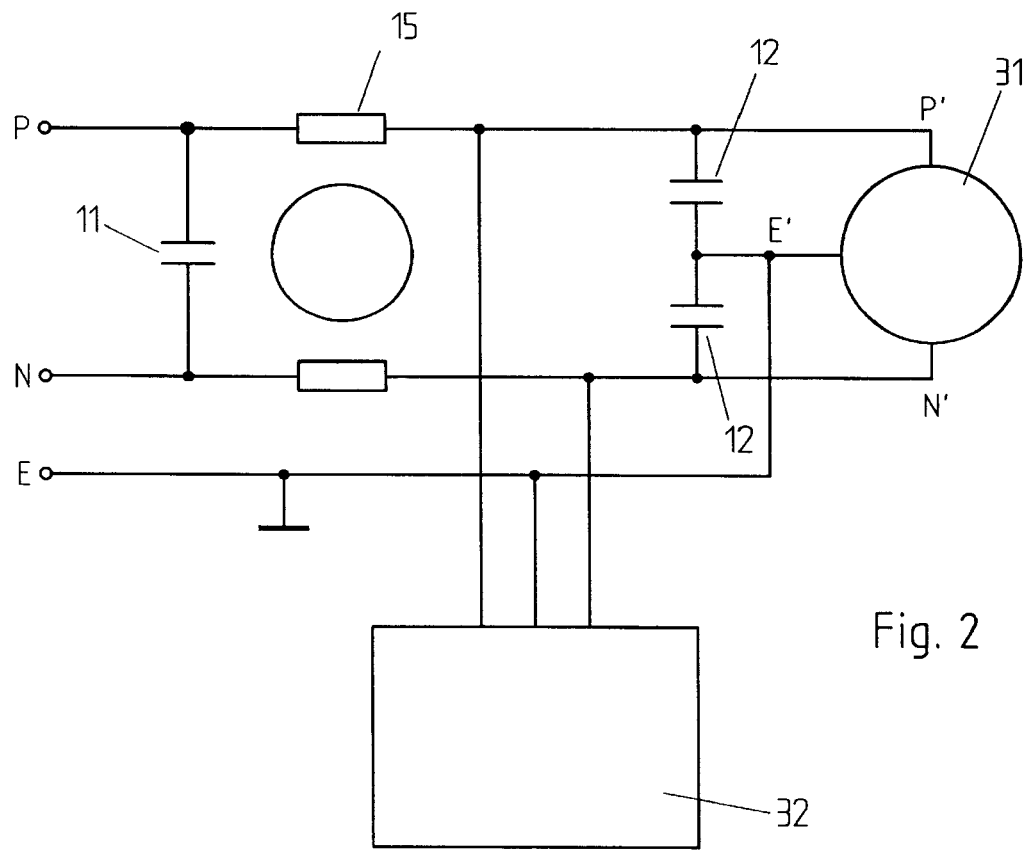
FIG. 2 represents a EMC filter connected to a machine tool according to one aspect of the present invention.

According to one aspect of the invention, the EMC filter includes active elements for suppressing an unwanted RF EMI component conducted by the mains line, without increasing leakage current, like in conventional passive EMC filters. With reference to FIG. 2 an EMC filter according to the invention comprises a current-compensated coil 15 and an active shunt module 32 presenting a low impedance for the RF EMI component which is shunted to ground and prevented from reaching the machine tool 31. The effectiveness of the active shunt module may be limited in the upper part of the frequency spectrum, due to the finite response time of electronics. In this case two small "Y" capacitors, introducing a negligible leakage, may be added for improving high frequency attenuation.

The EMC filter and the machine tool represented on FIGS. 1 and 2 are drawn as single-phase devices. It is to be understood, however, that three-phase or multi-phase devices and filters are also possible, and comprised in the scope of the present invention.

Figure 3:
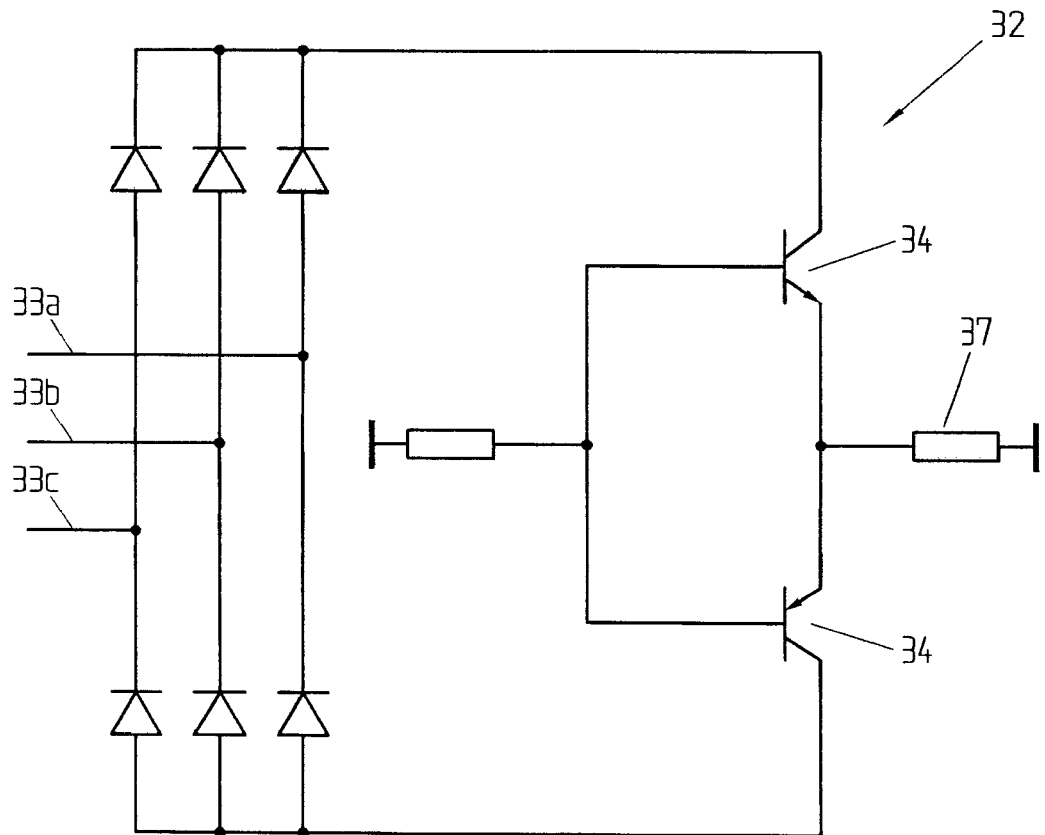
FIG. 3 represents an active part of the filter of FIG. 2.

An example of an active shunt module 32 is now discussed with reference to FIG. 3. This example refers to a three-phase circuit. It would be possible, in the scope of the invention, to modify it for a single-phase circuit. The active shunt 32 acts as a capacitive bypass for attenuating high frequency voltage components, notably noise, present on the power lines 33a, 33b and 33c. It comprises two complementary follower transistors 34 for shunting the RF EMI through the impedance 37.

Figure 7:
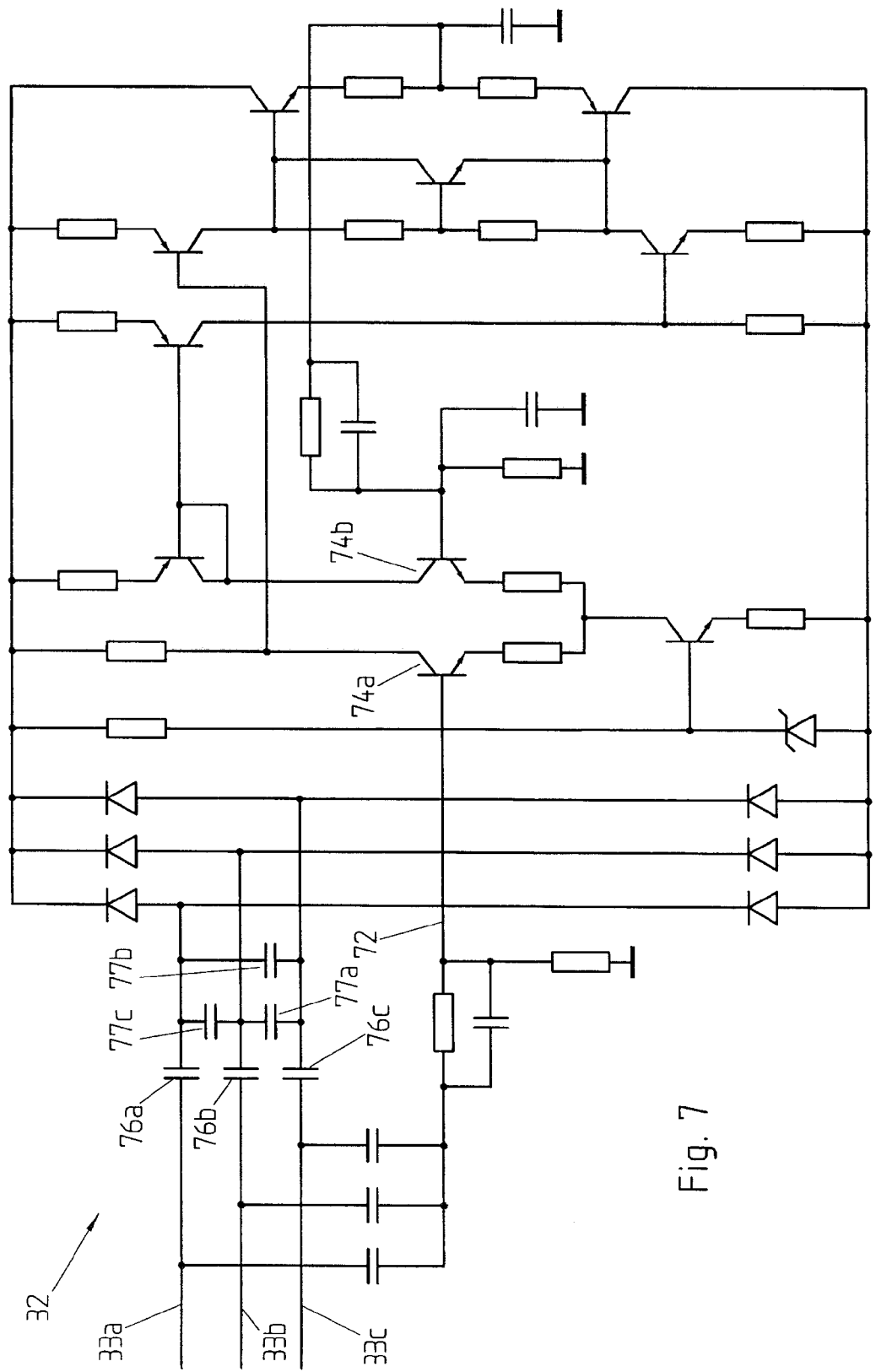
FIG. 7 shows another variant of shunt module for the filter of FIG. 2.

A further example of active shunt module 32 is presented in FIG. 7. The active module 32 is arranged for keeping the input point 72 at a potential close to ground potential, at frequencies where the unwanted noise is expected. The capacitors 76a, 76b 76c and 77a, 77b, 77c, form a voltage divider for the supply rails of the active shunt. In this way the active shunt module is supplied with a voltage which is lower than the mains voltage, for example one half of the mains voltage. This reduces the fault current to harmless levels, even in case of a breakdown of some component, and avoids the use of fuses, which have large stray inductance. Furthermore the device voltages in the active shunt are kept to manageable levels, by the capacitive divider.

The example shown above refers to the case of a three-phase mains supply. The present invention is not limited, however, to this disposition and the presented examples could easily be modified for operation in a single-phase supply line, should the need arise.

Figure 4:
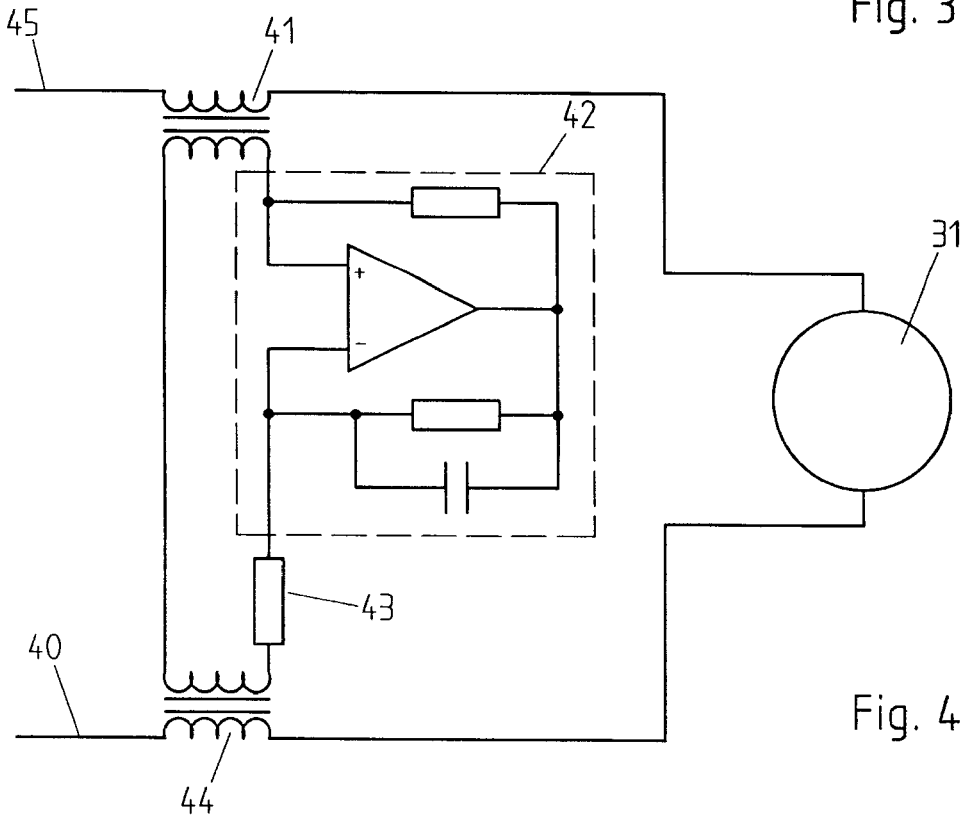
FIG. 4 shows a simplified diagram of a filter comprising a negative impedance converter according to one aspect of the invention.

FIG. 4 represents schematically another variant of an EMC filter according to the present invention. The filter comprises a Negative Impedance Converter (NIC) 42 thanks to which a winding of transformers 41 and 44 appear as a large series impedance to noise present on power lines 45, 40. The circuit of FIG. 4 allows effective filtering of the EMI to a machine tool device 31, by use of a small "Y" capacitor, which contributes negligibly to the leakage current.

Advantageously, in this case, the "Y" capacitors can be totally dispensed with entirely. The NIC circuit acts as a source of voltage which cancels the noise on lines 40 and 45.

Figure 5:
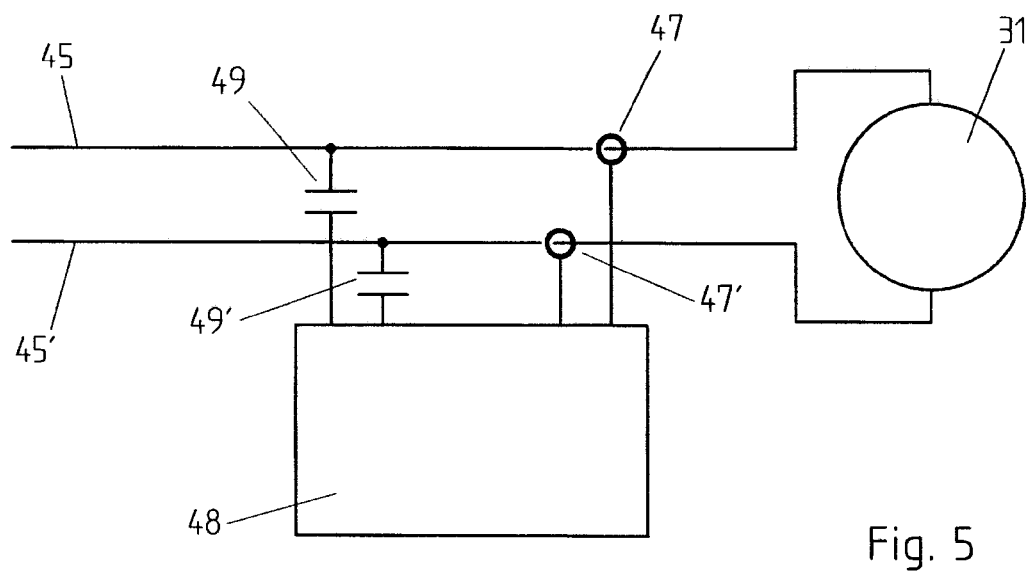
FIG. 5 shows a simplified diagram of a filter comprising a current pick-up detector according to one aspect of the invention.

FIG. 5 represent another variant of a filter according to the present invention comprising current sensors 47 and 47' and an active circuit 48 for injecting a noise correction current in the power lines 45 and 45', in order to cancel the EMI directed to the machine tool 31. Isolation between the circuit 48 and the supply lines 54, 45' is provided by isolation capacitors 49 and 49'. The current sensor 47 comprises, for example a pickup coil, for reading the RF EMI circulating along the supply line 45.

Further, even if not represented, it is to be understood that one of the current sensor could be omitted, and, in a variant, only one of the lines could be sensed. In a further variant a magnetic coil could be coupled with both the power lines 45 and 45' in order to sense, for example, a common-mode noise component.

Figure 6:
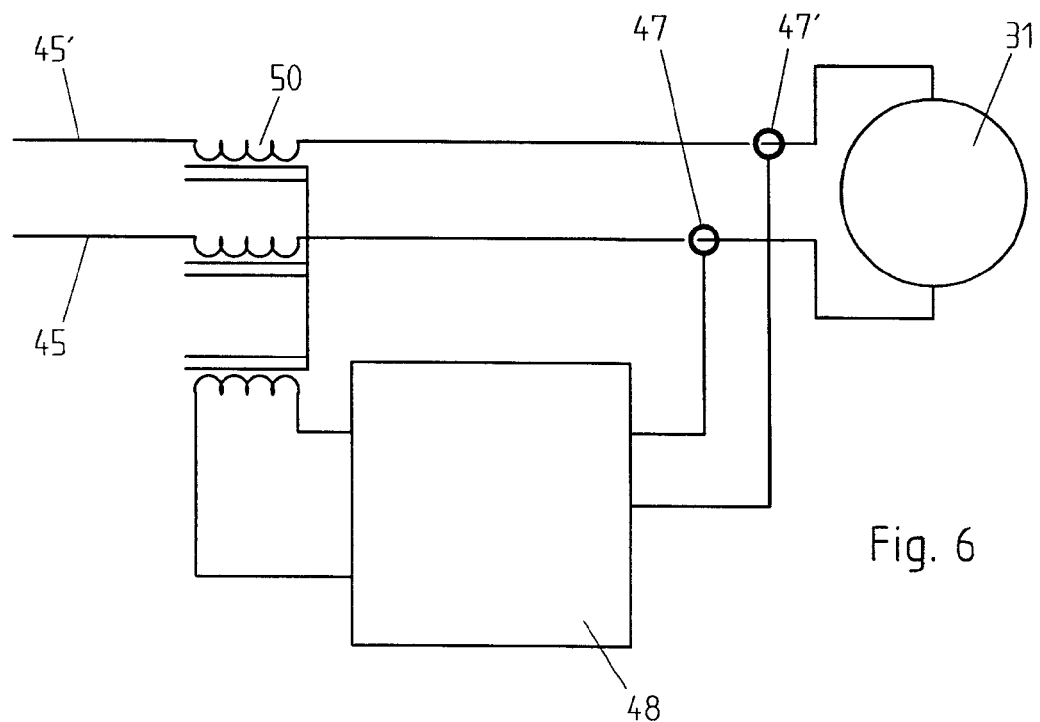
FIG. 6 shows a variant of the filter of FIG. 5.

FIG. 6 represents another variant of the filter of the invention in which the correction signal generated by the active module 49 is injected in the supply line 45, 45' by means of a transformer 50 magnetically coupling supply lines 45, 45' to the correction signal. It is to be understood that several forms of magnetic cores and windings bay be used for this purpose. In one advantageous variant the transformer 50 constitutes, with respect to the power lines 45, 45', a current-compensated impedance.

In not represented variants of the embodiments of FIGS. 5 and 6, the current sensors 47 and 47' may be replaced by transformers or by pick-up capacitors as voltage sensors. These embodiments of the present invention could also be adapted for a three-phase configuration.

It is an advantage of the above embodiments that the circuit 48 is not directly connected to ground, and could, if necessary be completely floated. In this way the unwanted possibility of stray leakage currents is further reduced.

The EMC filter of the invention is preferably included in a system comprising also a machine tool, connected to a mains supply line, the EMC filter providing attenuation of EMI transmitted along said supply line.

The invention claimed is:

1. A system comprising an electrical device in a machine tool or in an industrial power tool and an EMC electric filter, inserted on a supply line of said electrical device, wherein said EMC filter comprises an at least one inductance and an active shunt module for providing a low-impedance path for unwanted interferences from said supply line, said filter further comprises a voltage reduction means for supplying said active shunt module with a voltage that is lower than the voltage of said supply line.

2. The system of claim 1, wherein said voltage reduction means include a capacitive voltage divider for supplying a voltage that is lower than the voltage of said supply line to a rectifying circuit.

3. The system of claim 1, wherein said EMC filter is arranged for suppressing a common-mode interference transmitted on said supply line.

4. The system of claim 1, wherein said supply line is a single-phase or a three-phase mains line.

5. The system of claim 1, wherein said EMC filter further comprises phase-to-ground capacitors.

6. The system of claim 1, wherein said EMC filter comprises an impedance converter.

7. The system of claim 6, wherein said EMC filter comprises a transformer, one winding thereof being connected in series on said supply line, and another winding thereof being connected to a negative impedance converter.

8. The system of claim 1, wherein said filter comprises a voltage or current pick-up means, for detecting a disturbance signal on said supply line, an active circuit for generating a correction signal based on said disturbance signal, and a signal injection means for injecting said correction signal in said supply line.

9. The system of claim 1, wherein leakage current is controlled.

* * * * *